April 3, 1973    J. D. SMITH    3,725,233
ELECTRO-OSMOSIS SYSTEM
Original Filed June 5, 1969

United States Patent Office 3,725,233
Patented Apr. 3, 1973

3,725,233
ELECTRO-OSMOSIS SYSTEM
Jack D. Smith, Boston, Mass., assignor to American Bioculture, Inc.
Original application June 5, 1969, Ser. No. 830,688, now Patent No. 3,657,106. Divided and this application Apr. 14, 1972, Ser. No. 244,138
Int. Cl. B01d 13/02
U.S. Cl. 204—180 P
2 Claims

ABSTRACT OF THE DISCLOSURE

A desalting system making use of electro-osmosis is similar to conventional electrodialysis arrangements in that the input solution is passed between a pair of membranes one of which is anion permeable and the other cation permeable, an applied electric field causing the anions and cations to leave the solution by migrating through the respective membranes. However, unlike conventional electrodialysis membranes, the membranes are also relatively permeable to water. The resulting flow of water toward and through the membranes materially increases the rate at which ions are transported to the membranes and correspondingly increases the rate at which ions are removed from the input solution.

RELATED APPLICATION

This is a divisional application of U.S. Ser. No. 830,688, filed on June 5, 1969 by Jack D. Smith now U.S. Pat. No. 3,657,106.

BACKGROUND OF THE INVENTION

(A) Field of the invention

This invention relates to a process and apparatus for removing salts from water or other solvents.

The desalting of water has become increasingly important in recent years, several factors having contributed to this. In the first place, there has been an enlarged consumption of fresh water in areas having insufficient supplies to meet the increased demand. At the same time, the techniques for removing salt from sea water or brackish water have been improved to the point where they are economically feasible in many situations where water of this type is available.

(B) Prior art

Of particular importance in relation to the present invention is the relatively small inland installation having a large supply of brackish water and situated sufficiently far from a source of naturally fresh water to make transportation of the latter very expensive.

Two systems have generally been proposed for desalting the brackish water in these locations to render it potable and also useful for industrial purposes. One of these is an electrodialysis system in which the brackish water is passed between pairs of ion exchange membranes that are permeable to ions but not to water. One of the membranes in each pair is permeable to cations and the other to anions. An electric field is applied to remove the salt ions from the input solution by forcing them through the respective membranes into a stream of waste water.

The second arrangement makes use of reverse osmosis. The incoming water is forced against a membrane that is permeable to water but not to the ions dissolved therein. The desalted water therefore passes through the membrane, leaving the salts behind.

An important characteristic of a membrane-type system is the rate of fresh water production per unit of membrane area. This is important largely because the cost of the membrane is a very substantial factor in the cost of the fresh water obtained from the system. As one might expect, the output can be increased by increasing the intensity of the applied field in an electrodialysis unit, or increasing the input pressure in a reverse osmosis unit. However, there are very practical limitations on both field intensity and pressure. It is therefore desirable to work toward a reduction or elimination of some other limiting factor in order to increase output and concomitantly reduce costs. It is to this that the present invention is directed.

OBJECTS OF THE INVENTION

More particularly, a principal object of the present invention is to provide a membrane-type desalting system having an increased output per unit of membrane area.

A further object of the invention is to provide a desalting system of the above type characterized by a relatively high reliability and relatively low maintenance cost.

Yet another object of the invention is to provide a desalting system of the above type having a lower energy consumption than similar systems used in the past.

A still further object of the invention is to provide a desalting method having the foregoing characteristics.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings, in which.

SUMMARY OF THE INVENTION

The present invention is based on electrodialysis in that it uses this process for the separation of salt ions from water or other solvents. However, contrary to previous practice, and, indeed, contrary to the prescriptions of knowledgeable workers in this field, I use membranes that are permeable to the solvent as well as the ions. As a result, there is a flow of solvent through the membranes, in addition to the electrical transport of ions through them. This flow in turn provides a flow of solvent toward each membrane in the region immediately adjacent to the surface of the membrane facing the input solution. The flow carries with it ions of the type to which the membrane is permeable, thus increasing the supply of ions at the membrane surface and thereby substantially increasing the transport of ions through the membrane. In other words, the solvent flow through the membranes increases the rate at which a membrane of given area can remove salt from the input solution.

More specifically, the maximum rate of ion removal has been limited by the rate at which ions can be brought to the surfaces of the ion exchange membranes. The latter rate is limited by the rate of diffusion of ions from the bulk input solution up to the membrane surface. Diffusion is a substantially slower process than the transport of ions through the membrane itself, and, therefore, this diffusion has heretofore limited the rate of ion removal per unit of membrane area.

Figure 1:
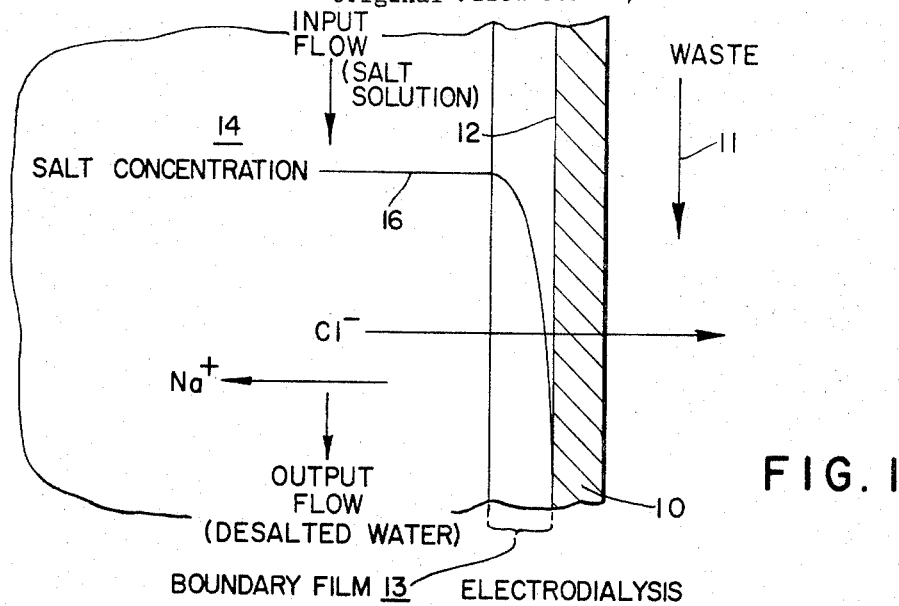
FIG. 1 is a schematic diagram illustrating factors affecting the operating of an ion-exchange membrane in an electrodialysis desalting system.

This phenomenon is illustrated in FIG. 1, which shows the effect of an electrical potential difference $\Delta V$ across an anion permeable membrane 10 in transporting anions (e.g. $Cl^-$) through the membrane to a concentrated waste stream 11. To the left of the membrane 10 is a cation permeable membrane (not shown) across which are transported an equivalent qauntity of cations (e.g. $Na^+$).

At the input surface 12 of the membrane 10, the electric field moves anions to the right into the membrane and, at the same time, moves cations to the left. This depletes the concentration of both anions and cations in a boundary layer 13 at the surface 12. Because of this depletion, both anions and cations move, by diffusion, into the layer 13 from the bulk input solution 14 to the left thereof.

The membrane 10 is impermeable to cations. Therefore, the diffusion of the cations to the right into the layer 13 must equal the electrical transport of the cations to the left, so that the net cation transport into or out of the boundary layer is zero.

On the other hand, the electrical transport of anions from the layer 13 to the right into the membrane 10 is augmented by the diffusion of anions to the right from the bulk solution 14. Although all of the anions are transported through the membrane electrically, approximately half of them are brought to the membrane surface by the diffusion, and conversely, the rate of ion transport through the membrane is about twice the rate at which the ions diffuse to the membrane surface. However, the ions are transported through the membrane 10 much faster than they can diffuse from the bulk solution 14 to the membrane surface 12. This can be seen from the curve 16 of FIG. 1, which illustrates the relationship between ion concentration and the distance from the surface 12. It is quite apparent that the relatively slow diffusion rate materially limits the rate at which ions are removed from the solution.

It is of interest to note that the reverse osmosis process is limited in similar fashion. In that case, the ions tend to pile up on the input side of the osmotic membrane and the rate at which they can diffuse back into the bulk solution is a limiting factor on the rate of salt removal.

As mentioned above, it has previously been deemed highly desirable to use electrodialysis membranes that are essentially impervious to the solvent from which the salt is to be removed. Indeed, these membranes are rejected if they exhibit any appreciable permeability to the solvent. Yet, I have found that a most desirable characteristic is substantial permeability to solvent. With reference to FIG. 1, this results in the flow of solvent to the right, toward and through the membrane 10. The solvent carries dissolved salt with it and brings this salt to the surface 12 of the membrane, thereby augmenting the diffusion process and providing ions to the membrane as fast as they can be electrically transported through the membrane.

In other words, the flow through the membrane 10 essentially eliminates the boundary layer 13, and correspondingly eliminates the limitation on salt removal rate previously caused by the need for anions to diffuse to the surface 12.

The invention provides further important advantages which will be more readily understood from the detailed description to follow.

DESCRIPTION OF THE PREFERRED EMBODIMENT

Figure 2:
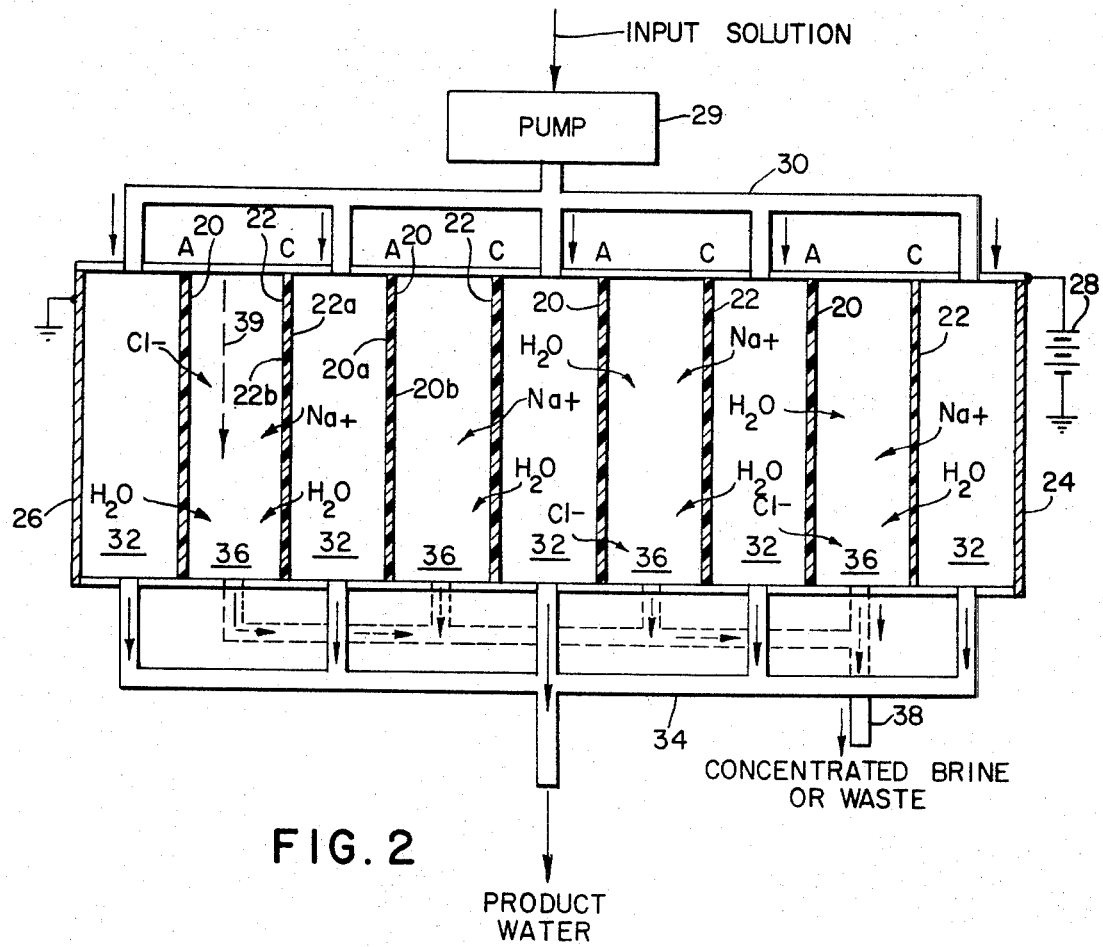
FIG. 2 is a schematic diagram of a desalting system incorporating the invention.

More specifically, as shown in FIG. 2, a desalting unit incorporating the invention comprises a stack of spaced-apart ion-exchange membranes, anion-permeable membranes 20 being alternated with cation-permeable membranes 22. The stack is disposed between an anode plate 24 and a cathode plate 26 connected to a power supply schematically indicated as a battery 28. An input solution to be desalted passes from a pump 29, through an input manifold 30, to the compartments 32 between alternate pairs of the membranes 20 and 22 and also, in the illustrated configuration, between the end membranes of the stack and the electrodes 24 and 26.

The desalted water leaves the compartments 32 by way of an exit manifold 34. A concentrated solution, or waste, generated in inter-membrane compartments 36 alternated with the compartments 32 leaves the system by way of a waste pipe 38.

In operation, the potential provided by the battery 28 causes transport of the cations ($Na^+$ in the example) to the left through cation-permeable membranes 22 and into the adjacent waste compartments 36. The same mechanism transports the $Cl^-$ anions to the right through the membranes 20 and into the compartments 36.

The membranes 20 and 22 are also permeable to water, which passes through these membranes from the compartments 32 to the compartments 36, as discussed above, to reduce the ion depletion in the boundary layers adjacent to the input surfaces 20a and 22a of the membranes. In the preferred embodiment of the invention, enough water passes through the membranes to provide the desired salt concentration in the compartments 36. This eliminates the need for a separate flow of wash water through the compartments 36 and the attendant pumping and piping costs for this flow characteristic of prior electrodialysis systems. Additionally, this obviates the need for an input or output manifold for the compartments 36, thereby permitting easy access to these compartments to clean them of scale and other debris.

Not only does the water flow through the membranes 20 and 22 materially reduce ion depletion on the surface 20a and 22a, the corresponding water flow away from the opposite surfaces 20b and 22b reduces ion concentration at these surfaces. Consequently, there is no longer a need for a substantial through flow (direction of the arrows 39) along these surfaces to sweep away the ions transported into the chambers 36. The membranes can therefore be supported by substantially continuous, highly porous spacers (not shown) disposed in the chambers 36, similar to the spacers used in reverse osmosis systems. This provides firm support for the membranes against the pressure differential between the compartments 32 and 36 and, in turn, permits the use of highly permeable membranes which are generally weaker than the relatively impermeable membranes used in prior electrodialysis systems.

As pointed out above, the transverse water flow through the membranes 20 and 22 largely stem from the relatively porous structure of the membranes. For example, in a typical conventional electrodialysis, system, the porosity or permeability of an ion-exchange membrane to water will be of the order of 200 ml. per Faraday of charge transport through the membrane. The range of permeability is generally around 100 to 300 ml. per Faraday. The membranes I prefer to use have a permeability that is an order of magnitude greater; for example, around 2000 ml. per Faraday. It should be understood that these are not hard and fast figures. The optimum permeability may vary with such factors as the concentration of the input solution. In any case, the permeability will be substantially greater than in conventional systems, i.e. generally at least twice as great.

The transverse water flow through the membranes is also a function of the pressure provided by the pump 29, this pressure being somewhat greater than that usually provided in electrodialysis systems, but less than the pressure used in reverse osmosis arrangement. With the proper combination of pressure and membrane porosity, it will often be possible to provide at salt concentration in the compartments 36 that not only eliminates the need for the flow of input water through these compartments, but also eliminates the need to recycle waste water through the system to conserve the input water. While these are both desirable features of the invention, it should be understood that the practice of the invention does not require them, since important advantages can be obtained in installations where, for one reason or another, it is desired to do without them.

The criteria I have established for membrane permeability result in a lower membrane cost, since it is easier to make ion exchange membranes that are permeable to water than to make ones that are relatively impermeable. In fact, a substantial factor in the cost of the prior membranes is the rejection rate due to supposedly unduly high water permeability.

The high permeability of the membranes also retards clogging of the membranes. It permits organic molecules to pass through which would otherwise be trapped on the surfaces 20a and 22a and, on the opposite surfaces 20b and 22b, the transverse water flow tends to remove scale deposits that would otherwise form on these surfaces and retard ion transport.

The use of highly permeable membranes makes possible still another advantage resulting from the consequent ability to provide a controlled difference in the permeabilities of the anionic-permeable membranes 20 and the cation-permeable membranes 22. Specifically, by making the cationic membranes 22 somewhat less permeable to water, one may create polarizing conditions at the surfaces of these membranes, thereby dissociating water molecules and creating hydrogen ions. These acid ions can replace at least part of the external acid feed normally used to combat calcium deposition in the waste stream compartments in both the electrodialysis and reverse osmosis processes.

The foregoing advantages relate primarily to the reduction of desalting costs through reduction of the capital cost of the equipment. However, the invention also reduces the operating costs. In the first place, maintenance costs are lower, as discussed above. Secondly, the electrical resistances of the membranes and of the waste compartments are also lowered by the invention. There is thus a corresponding reduction in the energy requirement, and operating energy is, of course, the predominant factor in operating cost.

It will thus be seen that the objects set forth above, among those made apparent from the preceding description, are efficiently attained.

What is claimed is:
1. In a method for removing salt from a solvent, the steps of
   (A) passing a salt solution through a space between a cation-permeable ion-exchange membrane and an anion-permeable ion-exchange membrane that are also substantially permeable to said solvent,
   (B) passing an electric field through said membranes and said space so as to transport ions form said space through said membranes, and
   (C) applying a sufficient pressure differential across said membranes to flow sufficient solvent through them to transport salt ions to said membranes substantially as fast as the ions are transported through said membranes.
2. The method defined in claim 1 in which the solvent flow is sufficient to provide the desired salt concentration in the resulting solution on the opposite sides of said membranes from said space.

References Cited
UNITED STATES PATENTS

| | | | |
|---|---|---|---|
| 2,987,472 | 6/1961 | Kollsman | 204—180 P X |
| 3,309,301 | 3/1967 | Kollsman | 204—180 P |
| 3,025,227 | 3/1962 | Kollsman | 204—180 P |
| 3,359,194 | 12/1967 | Kollsman | 204—180 P |
| 3,392,100 | 7/1967 | Kollsman | 204—180 P |
| 3,525,682 | 8/1970 | McCrae et al. | 204—301 |

JOHN H. MACK, Primary Examiner

A. C. PRESCOTT, Assistant Examiner

U.S. Cl. X.R.

204—301